(12) United States Patent  (10) Patent No.: US 8,086,352 B1
Elliott  (45) Date of Patent: Dec. 27, 2011

(54) PREDICTIVE EFFICIENT RESIDENTIAL ENERGY CONTROLS

(76) Inventor: Scott Elliott, Snoqualmie Pass, WA (US)

( * ) Notice: Subject to any disclaimer, the term of this patent is extended or adjusted under 35 U.S.C. 154(b) by 491 days.

(21) Appl. No.: 12/284,795

(22) Filed: Sep. 25, 2008

Related U.S. Application Data

(60) Provisional application No. 60/997,426, filed on Oct. 4, 2007.

(51) Int. Cl.
- G01M 1/38 (2006.01)
- G05B 13/00 (2006.01)
- G05D 23/00 (2006.01)

(52) U.S. Cl. ......... 700/277; 700/275; 700/281; 700/282

(58) Field of Classification Search .................. None
See application file for complete search history.

(56) References Cited

U.S. PATENT DOCUMENTS

| | | | |
|---|---|---|---|
| 3,567,115 A | 3/1971 | Nelson | |
| 4,475,685 A | 10/1984 | Grimado et al. | |
| 4,479,604 A | 10/1984 | Didner | |
| 4,485,864 A | 12/1984 | Carrell et al. | |
| 4,530,395 A | 7/1985 | Parker et al. | |
| 4,582,249 A | 4/1986 | Nelson | |
| 5,476,221 A | 12/1995 | Seymour | |
| 5,544,809 A | 8/1996 | Keating et al. | |
| 5,682,949 A | 11/1997 | Ratcliffe et al. | |
| 5,785,243 A | 7/1998 | Cross | |
| 5,944,098 A | 8/1999 | Jackson | |
| 6,196,468 B1 | 3/2001 | Yong | |
| 6,349,883 B1 | 2/2002 | Simmons et al. | |
| 6,645,066 B2 | 11/2003 | Gutta et al. | |
| 6,726,113 B2 | 4/2004 | Guo | |
| 6,865,596 B1 * | 3/2005 | Barber et al. | 709/208 |
| 6,909,921 B1 | 6/2005 | Bilger | |
| 6,983,889 B2 | 1/2006 | Alles | |
| 6,997,390 B2 | 2/2006 | Alles | |
| 7,138,732 B2 | 11/2006 | Biskup, Sr. et al. | |
| 7,188,779 B2 | 3/2007 | Alles | |
| 7,207,496 B2 | 4/2007 | Alles | |
| 7,392,661 B2 | 7/2008 | Alles | |
| 2002/0134849 A1 | 9/2002 | Disser | |

(Continued)

OTHER PUBLICATIONS

IEEE, The Institute of Electrical and Electronics Engineers, Inc., IEEE Std 802.15.4-2003 IEEE Standard for Information technology—Telecommunications and information exchange between systems—Local and metropolitan area networks—Specific requirements Part 15.4: Wireless Medium Access Control (MAC) and Physical Layer (PHY) Specifications for Low-Rate Wireless Personal Area Networks (LR-WPANs) Oct. 1, 2003.

(Continued)

*Primary Examiner* — Ramesh Patel
*Assistant Examiner* — Sunray Chang
(74) *Attorney, Agent, or Firm* — Seed IP Law Group, PLLC

(57) ABSTRACT

A HVAC controls system for zone controls that is comprised of one or more Wall Sensor Units (WSU) and zero or more Damper/Register Units (DRUs). The invention is a low networked cost solution for residential and light commercial that is easy to install in new and existing building. The WSUs detect, log and use occupancy data to predict where in a building HVAC conditioning is needed and to save energy where it is not needed. The DRU use shape memory alloy wires to control the opening and closing of a damper plate with very little power allowing batter operation.

10 Claims, 10 Drawing Sheets

U.S. PATENT DOCUMENTS

| | | | |
|---|---|---|---|
| 2005/0143863 A1* | 6/2005 | Ruane et al. | 700/276 |
| 2006/0172694 A1* | 8/2006 | Gau et al. | 454/333 |
| 2007/0220907 A1* | 9/2007 | Ehlers | 62/126 |
| 2007/0233323 A1 | 10/2007 | Wiemeyer et al. | |
| 2008/0121729 A1 | 5/2008 | Gray | |

OTHER PUBLICATIONS

Aakash Patel, Sharath Kumar, and Young Chul Song, "MiSo* SWECSTM Actuators, " Department of Mechanical Engineering University of Michigan, 2004, Ann Arbor, MI.

Zigbee Alliance, ZigBee Specification V 1.0, Kinney Consulting LLC, 2004.

M.R. Brambley, et al; Advanced Sensors and Controls for Building Applications: Market Assessment and Potential R & D Pathways. US DOE, Apr. 2005. Washington DC.

Roger G. Gilbertson and Celene De Miranda, Muscle Wires Project Book, Mondo-Tronics, Incorporated; 3rd Rev edition (Nov. 2000).

David Cross and David Judd, "Automatic Setback Thermostats: Measure Persistence and Customer Behavior" Proceedings of the 1997 International Energy Program Evaluation Conference, Chicago, Aug. 27-29, 1997.

David Shiller, Energy Star Marketing Manager, Energy Star Programmable Thermostat Proposal to Industry, US EPA, Washington DC, Jan. 11, 2006.

Canmet Energy Technology Centre [CETC], "Zoned Heating & Cooling Innovation", Natural Resources Canada, 2006, Ottawa, Ontario, Canada , 2007.

Ecologix Heating Technologies, Inc, "Zone Comfort System", Cambridge, Ontario, Canada, Jul. 7, 2006.

Home Comfort Zones, Inc., "MyTemp™ System", Beaverton, Oregon, Mar. 2008 (www.homecomfortzones.com).

Home Comfort Zones, Inc., "Save Energy with the MyTemp™ System", Beaverton, Oregon, Apr. 1, 2008 (www.homecomfortzones.com).

Harvey M. Sachs, Programmable Thermostats, ACEEE, Washington, D.C, Dec. 2004.

Energystar, "ENERGY STAR® Program Requirements for Programmable Thermostats Eligibility Criteria (Version 1.2)", US EPA, Washington DC, Jan. 30, 2008.

Nassif et al., "Evolutionary Algorithms for Multi-Objective Optimization in HVAC System Control Strategy", International Conference of the North American Fuzzy Information Processing Society No. 23, Banff AB , Canada (2004) , IEEE, Piscataway NJ, 2004.

M. C. Mozer, L. Vidmar, and R. H Dodier, The Neurothermostat: Predictive optimal control of residential heating systems. In M. C. Mozer, M. I. Jordan, & T. Petsche (Eds.), Advances in Neural Information Processing Systems 9 (pp. 953-959). Cambridge, MA: MIT Press. (1997). (http://www.cs.colorado.edu/~mozer/papers/index.html).

M. C. Mozer, Dodier, R. H., Anderson, M., Vidmar, L., Cruickshank III, R. F., & Miller, D. (1995). "The neural network house: An overview." In L. Niklasson & M. Boden (Eds.), Current trends in connectionism (pp. 371-380). Hillsdale, NJ: Erlbaum. (http://www.cs.colorado.edu/~mozer/papers/nnh_overview.html).

* cited by examiner

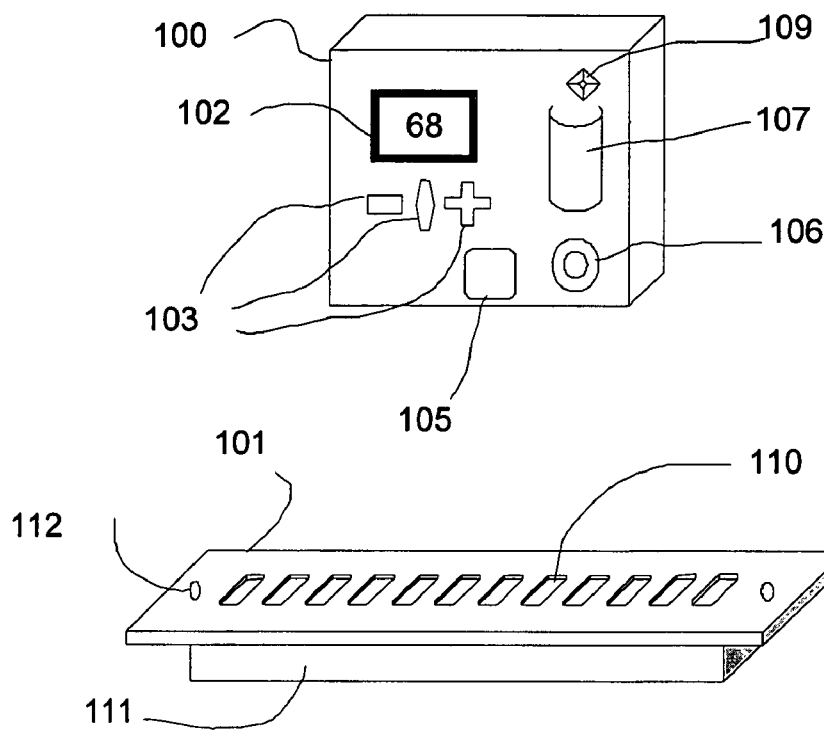
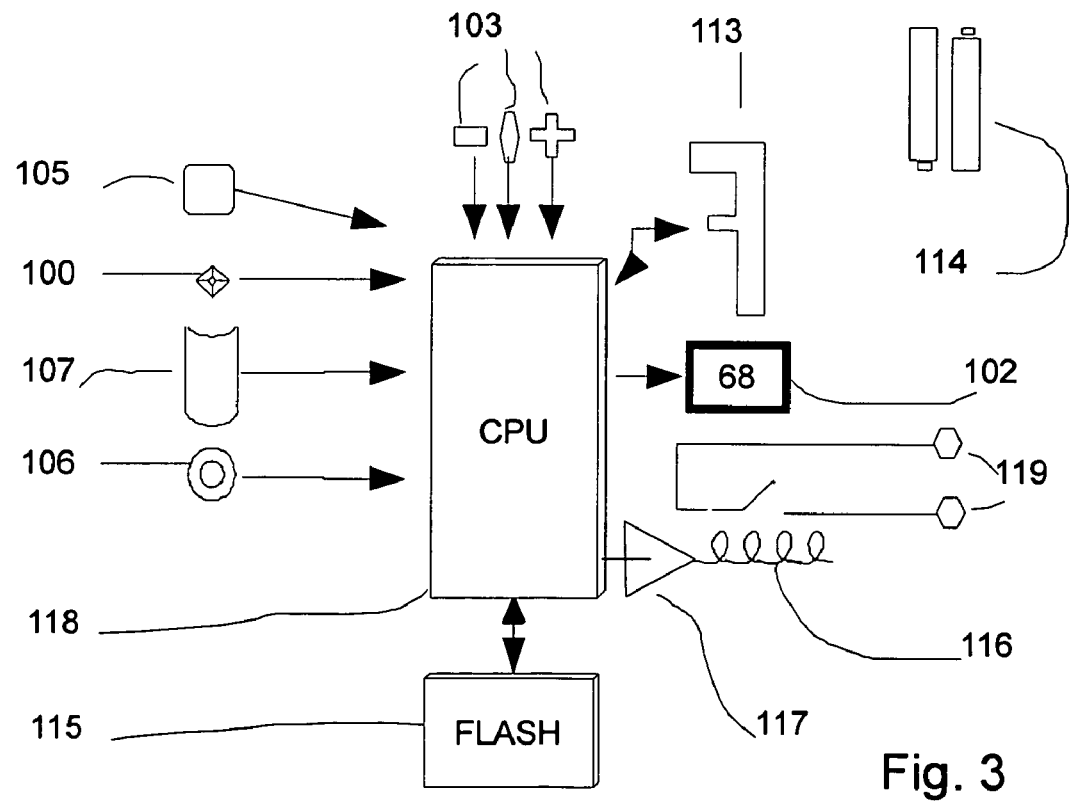

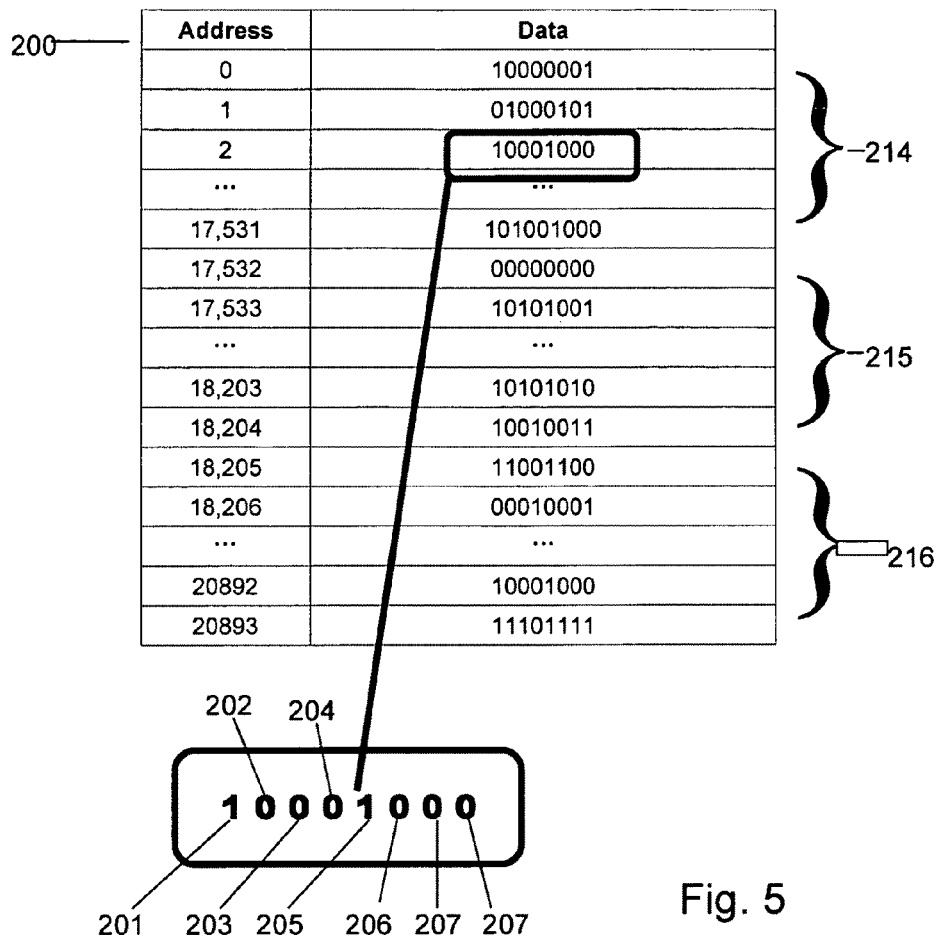
Fig. 5
$$Occ = \sum weights$$
Fig. 6
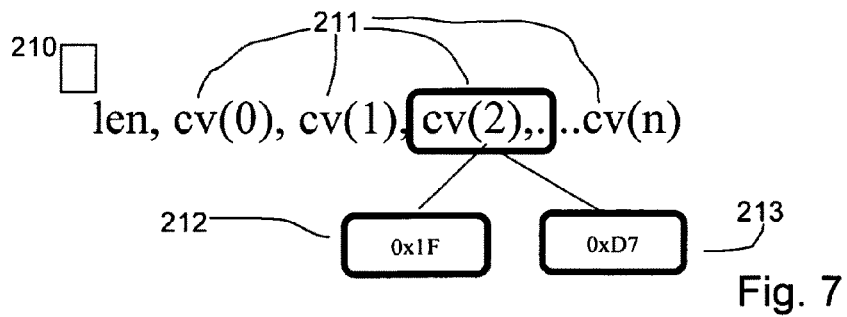
Fig. 7

PREDICTIVE EFFICIENT RESIDENTIAL ENERGY CONTROLS

CROSS-REFERENCE TO RELATED APPLICATIONS

This application is claims priority from U.S. provisional patent application Ser. No. 60/997,426, filed on Oct. 4, 2007, the contents of which are incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The technical field of this invention relates to zoned residential Heating Ventilation and Air Conditioning (HVAC) and lighting controls that employ embedded systems and wireless communications. HVAC systems use a large proportion of a building's energy usage and need to be optimized for both environmental and economic reasons.

There is a long history of invention and research associated with HVAC technology.

Programmable Thermostats Programmable setback thermostats that can be set by the occupant for set point, reset point and schedule have been available on the market for a number of years [EnergyStar]. In spite of favorable engineering analysis for prospective energy savings, field studies show that real-world field performance is no better than manual thermostats [Sachs] [Shiller] [Cross and Judd]. These studies have been suggested a number of causes including, dead band gap, difficulty of programming, and comfort issues, with the most likely cause being user overriding the energy saving features.

Residential and Light Commercial Zoning: Modern forced air zone control and VAV (Variable Air Volume) extends back decades. The most extensive use to date has been for commercial and industrial applications. There is substantial ongoing research, including that at the CEC as shown in "Advanced Variable Air Volume System Design Guide" [CEC] and Natural Resources. Canada's CANMET Energy Technology Centre (CETC) is currently involved in an ongoing residential zoned research project[CANMET Natural Resources Canada] with the company Ecologix [Ecologix Heating Technologies, Inc]. Home Comfort Zone teaches a basic version of zoned HVAC control[Alles]. Zone HVAC controls and systems are also taught in the patents of [Alles] [Girmado][Parker][Jackson] and [Nelson]. These systems, have several failures: 1) they are expensive to install, 2) are even more expensive to retrofit and 3) they make use of a barometric bypass damper that recycles conditioned overpressure air back into the return system causing reduced performance of the central HVAC plant.

Automated diagnostics, performance monitoring and continuous commissioning: The importance of initial commissioning and ongoing monitoring has long been established in buildings[ASHRAE][Bushby][SoCal-Edison]. According to Brambley, "Performance monitoring, automated fault detection and diagnosis, commissioning, optimal control and the use of development environments, design tools and trainers are complementary, and in some respects synergistic technologies that have strong potential to realize significant energy savings and other performance improvements in commercial buildings, including existing buildings. There is a significant body of previous R&D relating to these technologies that indicates their potential, both generically and for specific approaches and methods. In a significant number of cases, there is the opportunity to establish R&D programs and projects that leverage this existing work in order to move relatively quickly to tools that can be deployed in the marketplace."

Actuated register/damper design: Actuated dampers and registers are very common in commercial and industrial HVAC installations and are occasionally seen in residential use. There are ongoing efforts to advance dampers such as pneumatic bladders [Alles], the technology offered by Zone Comfort as a retrofit option and the ratcheted Nitinol Shape Memory Alloy (SMA) based devices described by [Patel, et al].

Wired Network Technology: Wired electrical communication has been used for decades in residential HVAC controls. The most common use is the simple closure of a 24 VAC circuit to signal a central HVAC plant to turn on. Serial data links, Power Line Communication (PLC) and true networks are common in commercial HVAC application, but have seen limited use in residential HVAC. An example of a serial protocol is RS-232C. Examples of a of a wired network used in HVAC are BACNET and CANNET.

Wireless Technology: IEEE 802.15.4/ZigBee[IEEE][ZigBee Alliance] was essentially designed for sensor, command and control application such as residential HVAC. Other wireless technologies such as Z-Wave and Bluetooth are also in the marketplace.

Occupancy Sensors Industrial and commercial HVAC systems have long used occupancy sensors and some limited use has been seen in residential settings [Seymour][Simmions][Keating][Disser][Bilger][Gutta][Gua][Mozer].

Occupancy Prediction While scheduled occupancy has been wide spread for both residential and commercial use (see programmable thermostats above), sensor based predictive occupancy has not seen commercial success. Mozer teaches a concept of a Neurothermostat in his prototype "Adaptive Control of Home Environment," system that includes HVAC, domestic hot water and lighting control. The Neurothermstat makes use of a PC based neural network and X10 sensors and controls. Mozer reports that the X10 communication protocol adds too much latency for his application. The Mozer design uses standard neuro-network train with energy use and occupancy error as feed back values.

BRIEF SUMMARY OF THE INVENTION

Modern life has patterns centered around work and play. The system takes advantage of these realities in the home and predicts where energy is needed for maximum comfort and efficiency. Using integrated sensors, the embodiment learns the rhythms of the homeowners, what time they wake on a workday, what time they use the kitchen or what time they go to bed; and heats or cools individual rooms before they enter to the desired temperature. By learning how a family uses a home, the system greatly reduces the energy used in areas that are vacant, resulting in maximum comfort and efficiency. When a room is entered unexpectedly, the system rapidly brings the room to the desired temperature as the system focuses resources on real use. A combination of home zone controls, sensors and advanced learning software provide homeowners with a highly cost effective means of increasing comfort and reducing greenhouse emissions.

The system is intended to be very low cost in mass production and is designed for optional installation by the homeowner. The potential energy savings from advanced residential predictive HVAC zone controls is substantial. A first order analysis suggests that a savings of about 50% of HVAC energy usage versus a fixed manual thermostat can be expected, depending on resident usage patterns and climate. If, for example, just 10% of California homes were to implement a system that was able to achieve just a 10% air conditioning electricity savings, California could see a reduction of 111.54 mega Watts of peak demand as demonstrated by [CalEnergy Peak Loads]

Existing programmable EnergyStar thermostats' failure to perform [EnergyStar] in the field as well as anticipated is largely due to their complex user interface. The proposed system does not require complex user programming, but simply learns when a resident occupies a room and with a simple up/down button their preferred temperature setting. By having the room properly conditioned (heated or cooled) before a resident enters a room the system delivers a much higher acceptance of temperature setback than EnergyStar systems have been able to achieve.

The proposed system includes wireless duct register/damper units (DRUs) that control airflow into a room and wireless wall sensor units (WSU) that measure room temperature and occupancy. Each existing HVAC register is replaced with the new design and a wall sensor unit is placed in each room. In retrofits the existing HVAC thermostat is replaced with a special version of the wall sensor that can also control the central heat pump or furnace. Once installed the system will record the occupancy of each room and the preferred temperature. The system then reviews occupancy data and predicts if a room will be occupied and conditions the room appropriately. If an occupant unexpectedly enters a room the occupancy sensors detect entrance and focus the HVAC system onto that room to quickly condition it.

The system has great potential to integrate into other long term energy efficiency efforts beyond immediate energy savings. This smart residential HVAC system can easily be integrated with fresh air economizers such as the one demonstrated in the California Department of Energy's PIER Night Breeze project and indeed extended by opportunistically over cooling expected unoccupied rooms when cool outside air is available. The system also easily integrates future opportunities, including smart grid interfaces for on-demand load shedding, dynamic cost response changes to set points and time of day load shifting.

Advantages of the invention include a low manufacturing cost, a low installation cost, very high energy use efficiency, high user acceptance, high comfort level and a low error rate.

BRIEF DESCRIPTION OF THE SEVERAL VIEWS OF THE DRAWING

FIG. 1 illustrates a non-limiting example of components for a single zone that includes a wall sensor unit and one or more automated dampers units.

FIG. 3 illustrates a non-limiting example of a block diagram of certain electronic components that comprise a typical wall sensor unit.

FIG. 5 illustrates a non-limiting example of certain data structures.

FIG. 6 illustrates a non-limiting example of a weighting summation function for a Decaying Occupancy Temporal (DOT) Algorithm FIG. 7 illustrates a non-limiting example of a weighting function.

DETAILED DESCRIPTION OF THE DRAWINGS

Referring in particular to FIG. 1, Wall Sensor Unit, 100 is representative of a device that includes a display sub system such as a LCD 102, one or more button, 103, an environmental sensor subsystem composed of temperature and humidity sensors, 105, an acoustic sensor, 106, a motion sensor, 107, and a light sensor, 109. Also in FIG. 1 is a representation of a register/damper unit, 101, that acts as a terminal unit and includes vent holes, 110, a duct skirt, 111, and one or more optional mounting holes for screws, 112.

Figure 2:
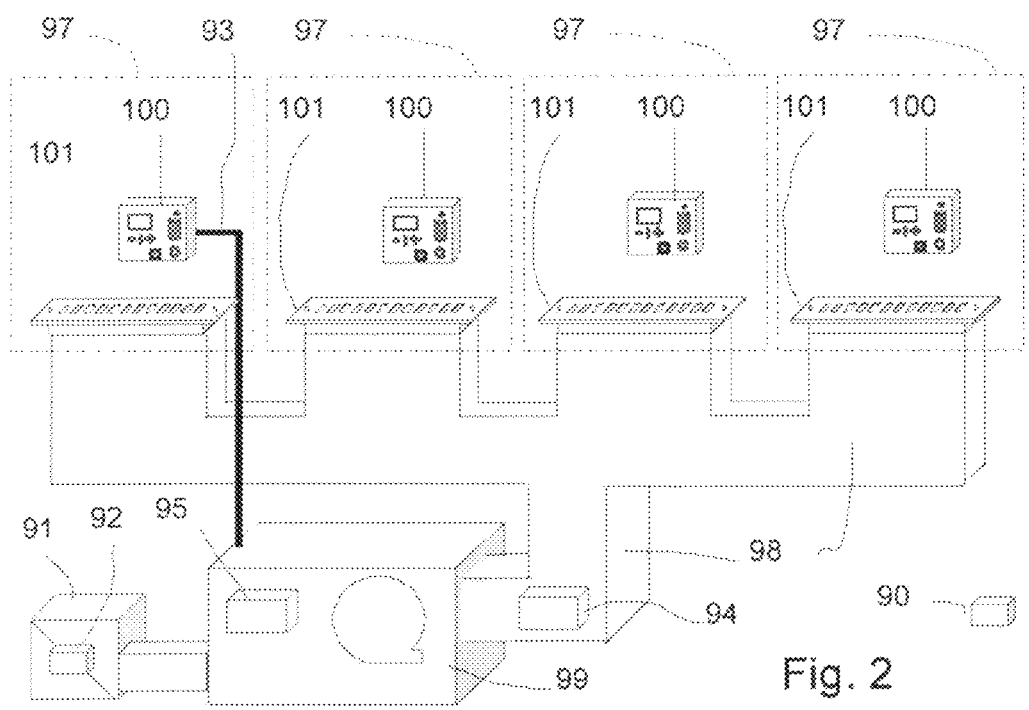
FIG. 2 illustrates a non-limiting example of a block diagram of certain electronic and mechanical components that comprise an example installation.

FIG. 2 shows block drawing of an embodiment of the system with four zones, 97, with each zone having a Wall Sensor Unit, 100, a register/damper unit, 101, supply duct work 89, and a furnace or other HVAC plant, 99. Not shown in the drawing is a return duct to the HVAC plant, 99. A wired connection from a single wall sensor unit is shown to the HVAC plant, 93 or as an alternate embodiment a system controller 92. A duct pressure or flow sensor is shown 94. A fresh-air economizer is shown, 91, in the return air duct with a wireless control unit 92, controlling the flow direction. An outside air enthalpy sensor is shown, 90.

FIG. 3 shows the electronic components of a preferred embodiment of the wall sensor unit shown in FIG. 1 that includes a display system sub system such as a LCD 102, one or more buttons, 103, an environmental sensor subsystem composed of temperature and humidity sensors, 105, an acoustic sensor, 106, a motion sensor, 107, a light sensor, 109, a RF antenna, 113, one or more batteries, 114, one or more persistent data storage devices such as FLASH, battery backed SRAM, a hard disk drive or other persistent data storage device for holding the program and data, 115, a relay, solid state relay, direct logic level output or other digital interface for signaling HVAC devices, 116, analog signal conditioning and buffering circuits such as a transistor or MOSFT, 116, for controlling the HVAC interface, 116, the connection points such as a screw or push terminal to the HVAC equipment, 119, and one or more CPUs that support a wireless communication protocol, such as a ZigBee, and can support the basic control and I/O functions of an embedded processor.

Figure 4:
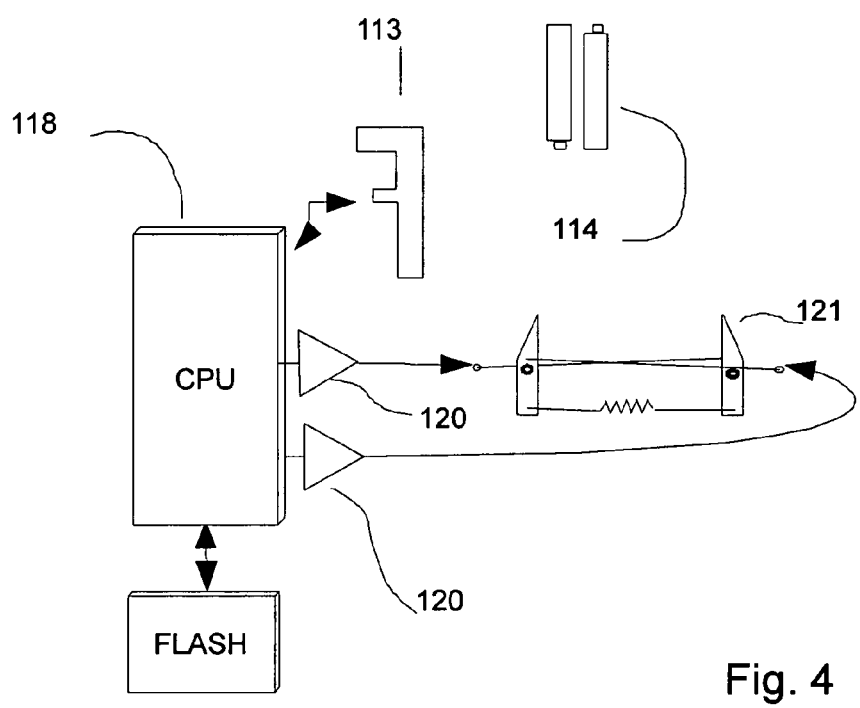
FIG. 4 illustrates a non-limiting example of a block diagram of certain electronic components that comprise a typical damper/register unit.

FIG. 4 shows the electronic components of a preferred embodiment of the damper register unit shown in FIG. 1 that includes an actuator such as a DC motor, a solenoid, a shape memory alloy device, 121, a RF antenna, 113, one or more batteries, 114, one or more persistent data storage devices such as FLASH, battery backed SRAM, a hard disk drive or other persistent data storage device for holding the program and data, 115, a pair of analog signal conditioning and buffering circuits such as a transistor or MOSFT, 120, for controlling the actuator, 121 and one or more CPUs that support a wireless communication protocol, such as a ZigBee, and can support the basic control and I/O functions of an embedded processor.

FIG. 5 shows an embodiment of a data structure for storing occupancy events. Each bit stores a history for a 15 minute block of time with each byte representing 8 15 minute time blocks or 2 hours of time. A value of 1 in a bit represents occupancy during that block of time and a 0 represents non-occupancy. The bytes are arranged continuously in chronological order with 17,531 bytes used to represent 4 calender years, 214. This calendar includes a leap year day. The calendar is arranged starting with January 1 in the first byte and with leap year as the last year. This calendar is stored in persistent memory for each zone such as is shown in 115 in FIG. 3. Occupancy is recorded in 15 minute increments and 8 samples (2 hours) are combined into a byte. A day requires 12 bytes (4 samples/hour, 24 hours per day=4*24=96 samples/day/8 bits=12 bytes). On a bit level data is recoded working from the MSb to the Lsb; that is, for the first sample of leap year the datum would occupy bit 7 of byte 0, the second sample would occupy bit 6 of byte 0, the eighth sample would occupy bit 0 of byte 0 and the 9th sample would occupy bit 7 of byte 1. Temperature Set/Reset Point Record Structure, 215, data is recorded as unsigned 8 bit data in 0.5 deg. F. with 0 representing a null record. Therefore, a record of 1 represents 0.5 F, 2–1F, 144=72F. The data is recored linearly every 15 minutes starting with 00:00 h Sunday and ending with 23:45 Saturday and wrapped as needed. A null (0x00) value indicates that no value has been entered yet and the last valid value should be used, if none use the building default. A total of 672 bytes are reserved for this use. Error Log Record Structure, 216, The error log indicates if occupancy was not as calculated. It is recorded in a format similar to occupancy, but is only recorded for the previous 4 weeks in 2688 bytes. FIG. 6 indicates the function to parse & weigh likelihood of occupancy. As indicated in FIG. 7 this function is called with a string command where the first 16 bit unsigned integer (uint 16), 210, is the number of weight code value pairs following (excluding the size of the length value). Following the length value are pairs of 8 bit unsigned integers (uint 8s), 211, that indicate the weight function shown as a hexadecimal number, 212, and weight value shown as a hexadecimal number, 213. The weight value, 213, is optimized by a genetic algorithm working in the background using the history of occupancy, 214, and the error log, 215, to evaluate the fitness of the existing population (weight values) and the new population.

Figure 8:
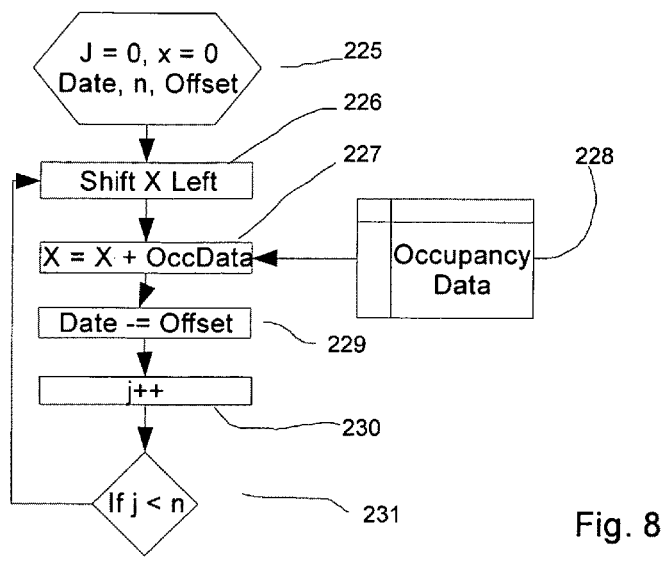
FIG. 8 illustrates a non-limiting example of a flowchart for evaluating a weighing. function.

FIG. 8 is a flow chart of one embodiment of an algorithm for calculating a likelihood of an occupancy occurring during a given time slot. The input values are the initial date-time, DATE, and offset between previous dates-times, Offset, initial values are initiated to 0 with j used as a iteration counter and X used as a working value to build the result, 225, the value X is shifted left one bit, 226, the number of iterations is indicated by n, the boolean that represents the date-time indicated by Date is located in the data base, 228, and added to the working value X, 227, the date-time is decremented by the value indicated by the input, Offset, and wrapped around to the far end of the database if the date-time is less than the start of the database, 229, the iteration counter j is incremented, 230, if the iteration counter is greater than zero then we branch to 226, but when the iteration counter reaches zero the function terminates by returning the working value X, 231. Typical values for n would be 4 and for Offset would be 15 minutes, hour, day, month or year. Additionally, the Offset can be date logical, for example, decrementing by weekday such that that decrementing from a Monday would result in the previous Friday or decrementing by weekend-day such that that decrementing from a Sunday would result in the previous Saturday.

Figure 9:
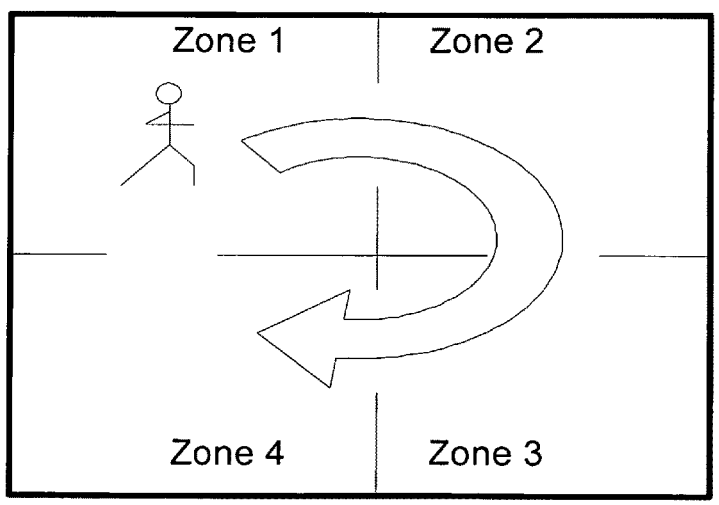
FIG. 9 illustrates a non-limiting example of a block diagram showing the triggering of multiple zones by an occupant.

FIG. 9 represents a pattern of motion by an occupant. At the building level the system looks for multi-room patterns of usage. The system coordinator, 95 or 100, runs a background process to poll the occupancy records of each wall sensor unit for the previous 28 days looking for reproduced sequences of events that occur at approximately the same time. The system coordinator builds, maintains and stores a list of these events such that if an occupancy event occurs the subsequent zones are conditioned to the set point temperature.

Figure 10:
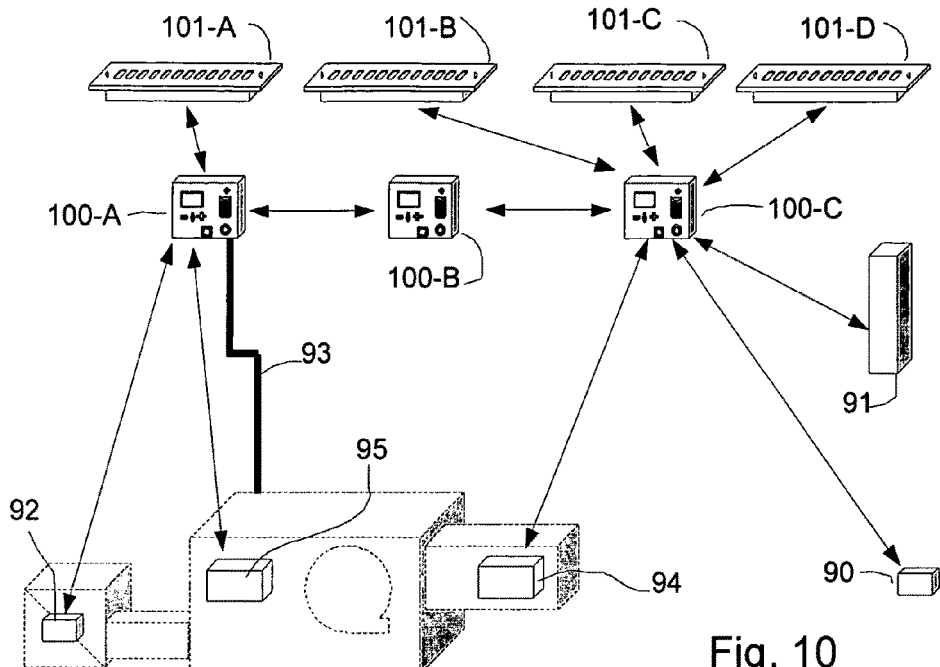
FIG. 10 illustrates a non-limiting example of communication paths between certain electronic components that comprise an example installation.

FIG. 10 represents the data flow in an installation. The damper/registers, 101-A, 101-B, 101-C, 101-D, furnace sensors/controls, 92, 94, 95 and outside sensors 90, act as limited function end device, the wall sensor units, 100-A, 100-B and 100-C all act as at least a routers. In the displayed configuration either wall sensor 100A or furnace control 95 would act as the network coordinator. In a retrofit where an adequate existing control wire, 93, exists from the furnace/AC to a suitable location on the wall, a furnace control unit would not be needed. The arrows show how a network can form and how data can be routed through different nodes. These communication routes would be different according to the number of nodes required per building, the locations of the nodes and the RF characteristics of each building. The communication routes will change over time because of changes in the RF characteristics of the building. A link to a PC or other networking device, 91, allows for a web interface for displaying to the homeowner the current status of the system and to allow for dynamic load shedding and setback/set point changes, support of real-time metering and smart grid functions. As an alternative embodiment, the wireless communication between all or come of the wireless links can be replaced with a wired link such as CANBUS.

Figure 11:
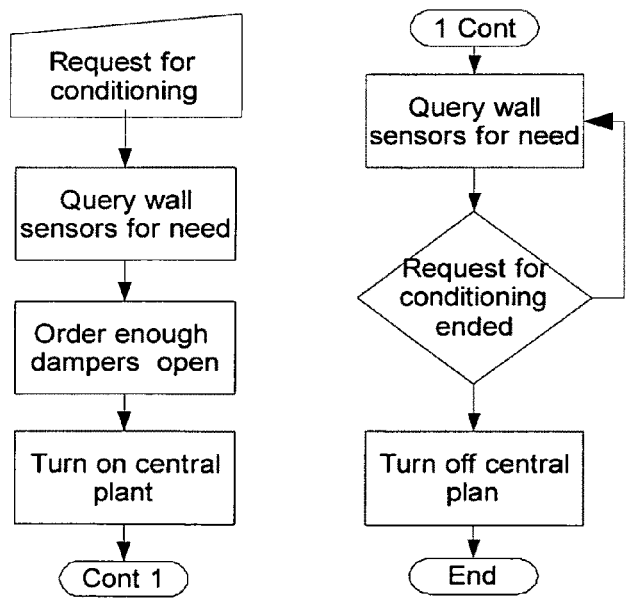
FIG. 11 illustrates a non-limiting example of a flowchart for opening dampers and controlling the central HVAC plant.

FIG. 11 represents the process that the coordinator goes through when a conditioning request arrives from a wall sensor or from the coordinator itself. When a request for conditioning arrives at the coordinator each of the other wall sensor units are required to determine their likelihood of requiring conditioning. Enough damper/registers are opened according to the likelihood of each zone requiring conditioning until enough open cross section is provided to allow for efficient energy transfer from the central plant, to keep noise to a minimum and to prevent damage to the duct work.

Figure 12:
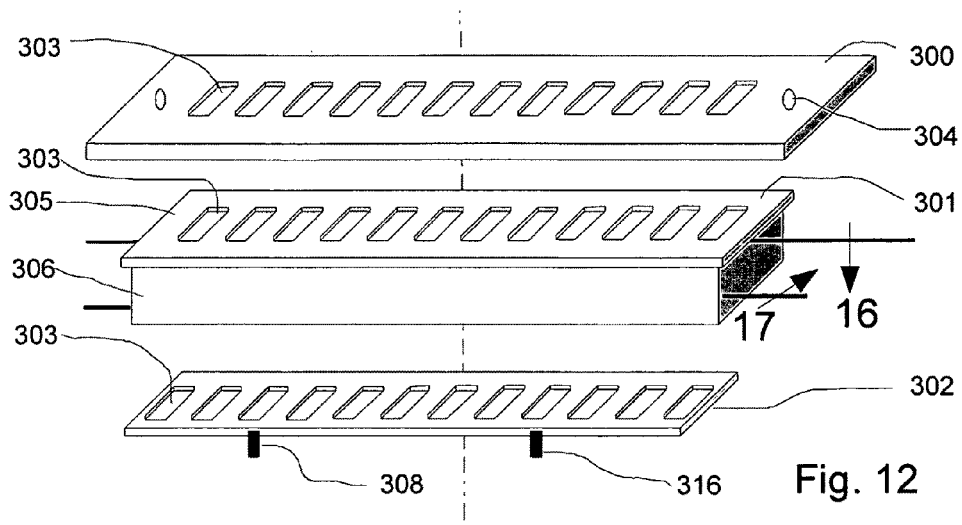
FIG. 12 illustrates a non-limiting exploded view of the preferred embodiment of a Damper/Register Unit (RDU)

FIG. 12 represents an exploded view of the preferred embodiment of the damper/register. A top cover, 300, that has a plurality of vent holes for the passage of air, 303, and a plurality of screw mount holes, 304. A functional unit, 301, that has a plurality of vent holes for the passage of air, 303, that attaches to the bottom of the top cover has a duct skirt, 306 and a top mount, 305. The damper plate, 302, that has a plurality of vent holes for the passage of air, 303, and push tabs, 308 and 316.

Figure 13:
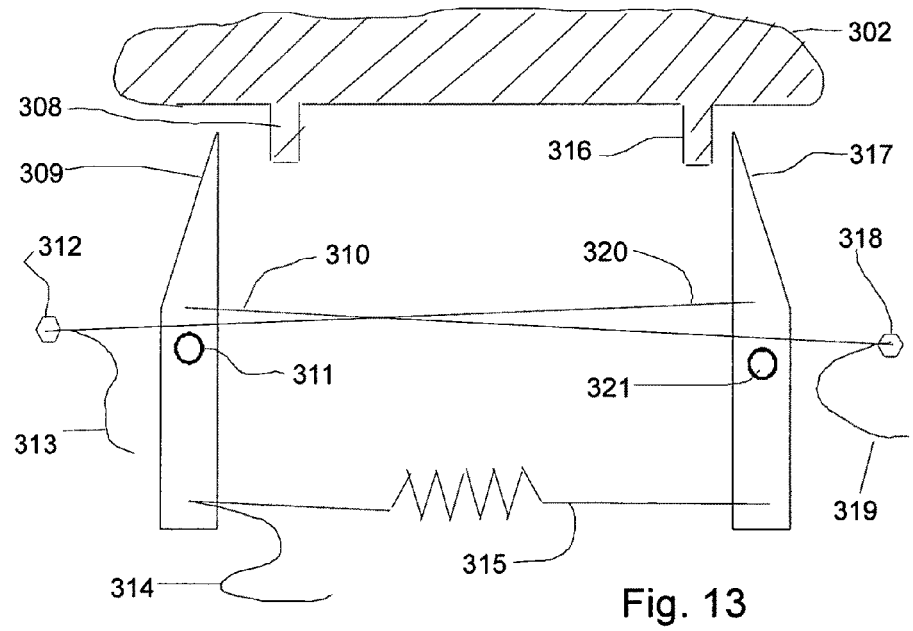
FIG. 13 illustrates a non-limiting example of a side sectional view of certain electrical and mechanical components that comprise the actuator mechanism the DRU in FIG. 12

FIG. 13 represents the mechanism that opens and closes the register/damper in FIG. 12. There are two metal pushers, 309 and 317, that pivot on studs 311 and 321 respectively. Two Shape Memory Alloy (SMA) wires, 310 and 320, are attached to the respective metal pushers and anchor points, 318 and 312. The SMA wires have lead wires, 319, 313, respectively. There is a metallic spring, 315, that is connected to each of the pushers on the opposite side of the pivot from where the SMA wires are attached with a lead wire, 314, attached to the spring. A SMA wire contracts when heated and in this embodiment a current is run through the SMA wire lead, 319 or 313 through the respective SMA wire and pusher to the spring, 315 and out to the spring wire lead, 314. The relationship between the pushers and the damper plate, 302, and push tabs 308 and 316 is shown with a partial display of the damper plate. The damper plate in this figure is shown in an intermediate open/close position.

Figure 14:
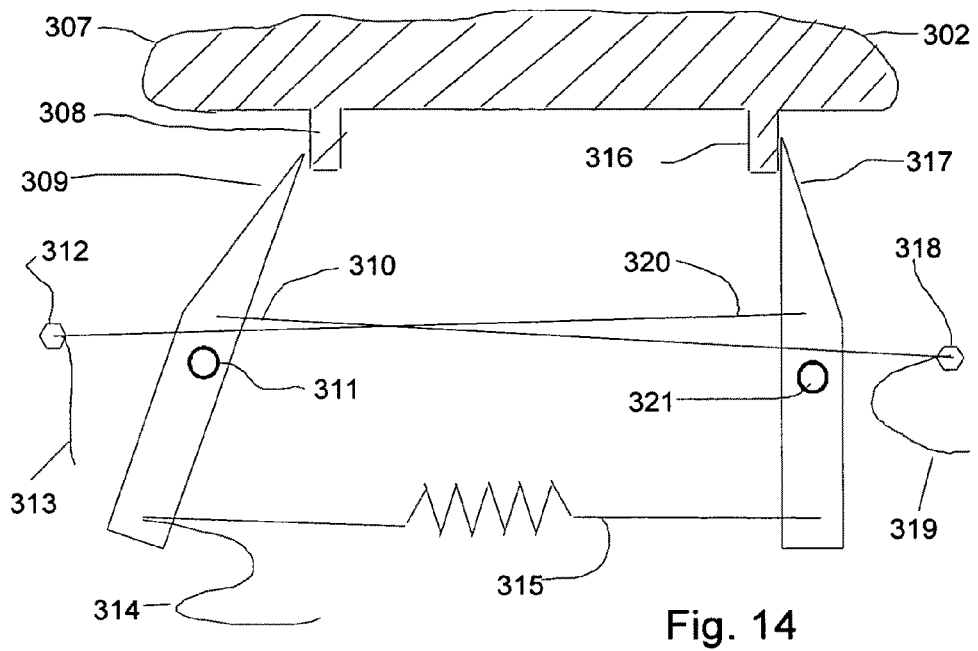
FIG. 14 illustrates a non-limiting example of a side sectional view of certain electrical and mechanical components that comprise the actuator mechanism the DRU in FIG. 12 in the closed position.

FIG. 14 represents the same components as shown in FIG. 13, but shows SMA wire 310 actively contracting and damper plate 302 in the open position.

Figure 15:
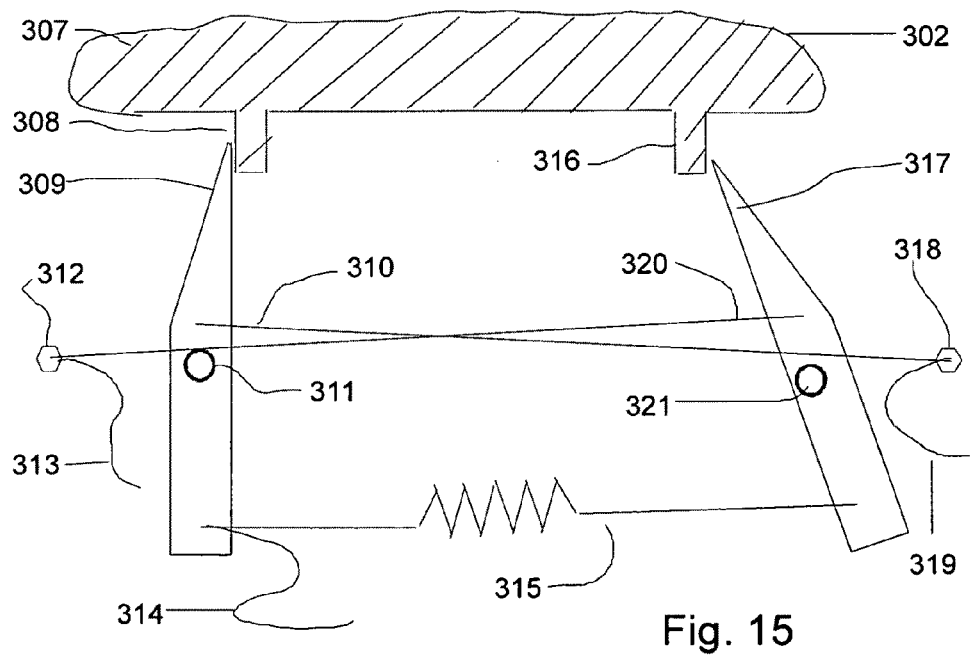
FIG. 15 illustrates a non-limiting example of a side sectional view of certain electrical and mechanical components that comprise the actuator mechanism the DRU in FIG. 12 in the open position.

FIG. 15 represents the same components as shown in FIG. 13, but shows SMA wire 320 actively contracting and damper plate 302 in the closed position.

Figure 16:
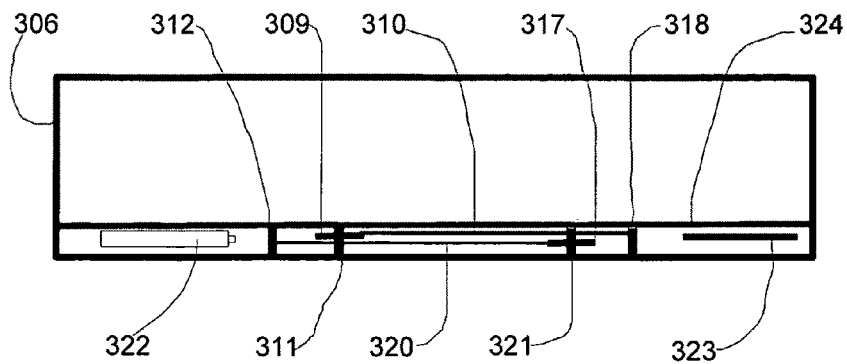
FIG. 16 illustrates a non-limiting example of a top sectional view of certain electrical, electronic and mechanical components that comprise the actuator mechanism the DRU in FIG. 12

FIG. 16 is a section view from above of the main register/damper piece, 301 at the level of the section shows the duct skirt, 306, from FIG. 13. Included in this figure are batteries, 322, the pivots 311 and 321, the anchor points, 312 and 318, the SMA wires, 319 and 320, the printed circuit board for the electronics, 323 and an internal mounting support 324. Not seen at this section level is the spring, 315 and the lead wires, 314, 313 and 319.

Figure 17:
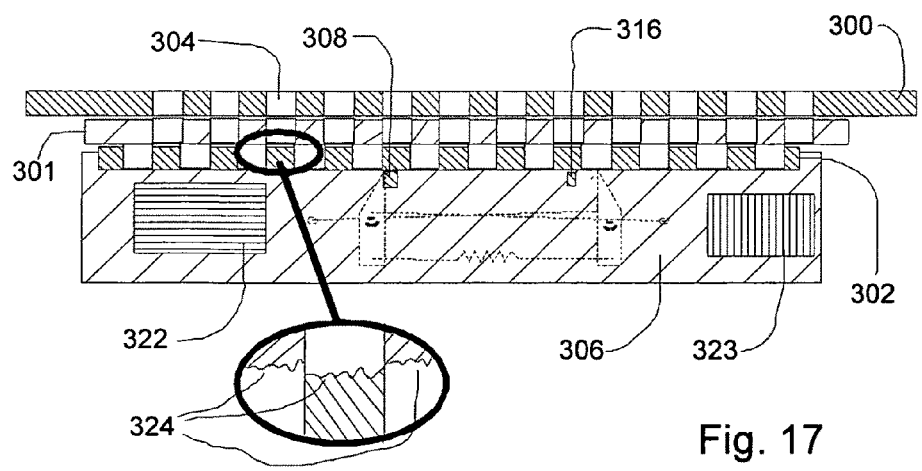
FIG. 17 illustrates a non-limiting example of a side sectional view of certain electrical and mechanical components that comprise the actuator mechanism the DRU in FIG. 12 showing the damper plate in the closed position and certain surface detail.

FIG. 17 represents a section view from the side of the register/damper from FIG. 12. The top cover, 300, the functional unit 301, and skirt 306, and the damper plate, 302, with push tabs 308 and 316, the batteries 322 and printed circuit board 323. The damper plate is shown in the closed position. The surfaces of the damper plate and functional unit that meet are roughed sufficiently to prevent uncommanded motion of the damper plate as indicated in the enlarged view indicated by 324.

Figure 18:
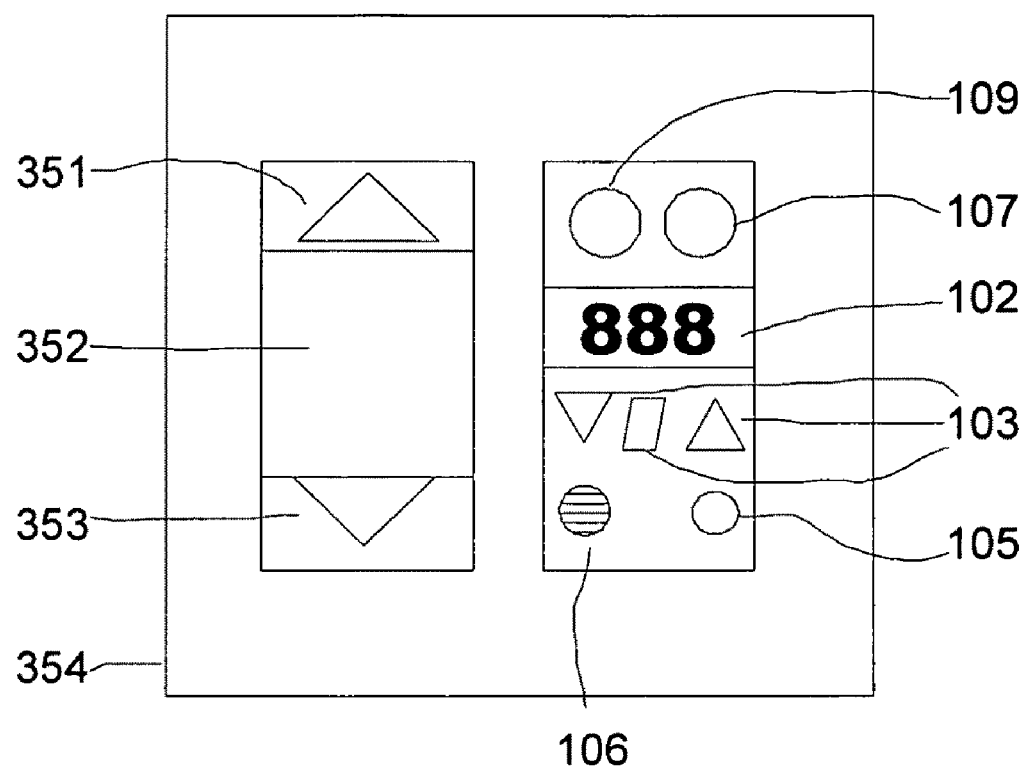
FIG. 18 illustrates a non-limiting example of an alternative embodiment of a Wall Sensor Unit (WSU) that includes buttons for controlling lighting.

FIG. 18 shows an alternative embodiment of the wall sensor unit, 100 from FIG. 1. As in FIG. 1 this embodiment includes a display sub system such as a LCD 102, one or more button, 103, an environmental sensor subsystem composed of temperature and humidity sensors, 105, an acoustic sensor, 106, a motion sensor, 107, and a light sensor, 109. Also included in this embodiment are the addition of three momentary switches 351, 352, 353 that are used for raising, toggling and dimming respectively a remote ZigBee light. The form factor is able to fit into a standard dual position modern style mud plate, 354 and standard two position junction box.

DETAILED DESCRIPTION OF THE INVENTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). Generally speaking, the systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program or script of instructions to perform desired functions by operating on input data and generating appropriate output. The techniques may be implemented in one or more computer programs or scripts that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. Storage devices suitable for tangibly embodying computer program instructions and data include all forms of volatile and non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits). The computer program instructions or scripts may also be provided as data signals embodied in a carrier wave or other propagation medium via a communication link (e.g., a modem or wired or wireless network connection).

This invention provides highly efficient, low cost and easy to install zoned HVAC controls for residential use. The system includes Wall Sensor Units (WSU) that superficially appear to be programmable thermostats, but include temperature/humidity, occupancy sensors, advanced software, processor, FLASH memory for recording occupancy information and a ZigBee wireless network capability. The system also includes ZigBee based wireless battery operated Damper/Register Units (DRUs) that are actuated by Shape Memory Alloy (SMA) wires. The preferred embodiment for the DRU includes two SMAs that when commanded each actuate a pusher that in turn each each presses on a push tab on the damper plate, and a single shared return spring. Also included in the system are additional components including ZigBee wireless outside air enthalpy sensors, ZigBee wireless duct pressure/flow sensors and HVAC plant controller where needed by the installation. Each of the components have an embedded MCU and ZigBee support. The system is intended to support zoned control and as each building the system is installed into is likely to be different the number and configuration of each installation will be different. Residential HVAC zones typical are based on a room that has a door that closes. There are some places where rooms are connected without doors that close such as is often found between kitchens and living rooms in open plan homes. In these cases where the air between rooms communicates well they may be treated as one zone. There are special cases in very large or unique rooms where the temperate difference between different places in the room can become uncomfortable, such as a long narrow room with large window only at one end, can be broken into more than one zone if there are HVAC supplies at each end that can be individually controlled. In each of these zones a WSU is placed on the wall and at least one DRU is placed at the exit of the HVAC source duct into the zone. If there is more that one HVAC outlet in a zone then each HVAC outlet has its own DRU. An exception to this is the case of a home, such as a studio, that is functionally a single zone then DRUs are not needed. The WSU in a zone controls each DRU in a zone via wireless ZigBee communication. Most communication between the WSU and DRU is from the WSU to the DRU ordering the DRU to open or close. The DRU will communicate back to the WSU open/close state confirmation, temperature, low battery and fault data. The DRUs act as a ZigBee End Device (ZED). Most WSU's function as ZigBee Router (ZR), but one WSU will act as a ZigBee coordinator (ZC) unless a HVAC central controller is present in which case the HVAC central controller acts as the ZC.

The WSU redundant occupancy sensors are able determine if the room is occupied. Redundant sensors are used because often one time of sensor will not be able to determine if a human is present. For example, PIR sensors can only detect humans when they move and microphones can only detect their presence when they make noise. Conversely, occupancy sensor often have false positives. By combining the inputs from multiple sensor and filtering, a much more accurate picture of occupancy can be obtained. Each WSU records the occupancy of its zone in its FLASH memory in 15 minute increments with a rolling record for 4 years. The occupancy record is used to predict future occupancy. The occupancy record is examined using a Decaying Occupancy Temporal (DOT) Algorithm by looking at periodic occupancy records with decaying impact from older records. Occupancy is recorded as 1 if occupied and 0 in unoccupied. For example if looking at the past four days then eight times the occupancy value the same time one day before the target record is added with four time sthe occupancy value from two days before plus two times the value of occupancy record from three days before plus the occupancy value from four days before. This algorithm can be used over different time intervals such as past n 15 minutes, past n hours, past n days, past n months, past n years or time-logical intervals such as past n week days, past n weekend days, same day of month past n months. These various occupancy interval measurements are weighted and summed and compared against a user configurable economy/comfort threshold. The weighing values for the various occupancy interval measurements are determined by a genetic algorithm running in the background that uses the uses the weighing values as the genetic representation and performance with recent occupancy history as a fitness function to select the weighting values. Each WSU also keeps a record of set points, reset points and ventilation rates in FLASH in 15 minute increments based on a one week calendar that can be altered by the occupants.

If the occupancy sensors or thermal sensors in a WSU are triggered a request is sent to the ZC. Every 15 minutes the ZC sends a command to the WSUs to execute the occupancy prediction algorithm and returns any conditioning results to the ZC. If there is a conditioning request pending the ZC opens a sufficient number of DRUs to keep the pressure of the ducts low enough to maintain a high enough air flow for heat transfer, HVAC central plant safety and to prevent damage to the duct system. The DRUs to open is determined by current HVAC needs and by near future HVAC needs by the ZC querying the WSUs that will run their respective prediction algorithms for current and near future occupancy as well as distance from current set/setback point. From these values, the ZC opens the next most likely DRUs to open until enough are opened to provide adequate air flow in the duct network and to also provide minimum building ventilation. The WSU contain a full set of algorithms for setback, pre-cooling, fresh air economizers, load shedding, economic/comfort trade-offs and time of day meters optimization. The ZC also contains a full set of algorithms for controlling all standard HVAC plant types as well as relays for signaling the central HVAC plant.

What I claim as my invention is:

1. A heating, ventilation and air conditioning control system for zone control with one or more wall sensor units comprised of a thermal sensor, one or more occupancy sensors, occupancy logging capability, occupancy prediction algorithms, a processor unit and network communications capabilities wherein the said heating ventilation and air conditioning system is further comprised of one or more heating ventilation and air conditioning automated damper/register units comprising two shape memory alloy wires, two push pieces, a processor unit and network communications capabilities.

2. The automated damper/register unit of claim 1 wherein said damper/register units are controlled with electric power such that in addition to at least one ground or common conductor have at least one conductor to drive the opening actuator and a second conductor to drive the closing actuator.

3. The automated damper/register unit of claim 1 wherein said damper/register unit's communication network capabilities consists of wireless network capabilities.

4. The automated damper/register unit of claim 1 wherein said damper/register unit's communication network capabilities consists of wired network capabilities.

5. The automated damper/register units of claim 1 wherein said damper/register unit's communication network capabilities consists of power line communication network capabilities.

6. The automated damper/register unit of claim 1 wherein said damper/register units use said occupancy data to control said zone damper/register unit to a temperature target set to a comfort point if predicted to be occupied or a economy point if predicted to be unoccupied.

7. The automated damper/register unit of claim 1 wherein said damper/register units are powered by batteries.

8. The automated damper/register unit of claim 1 wherein said damper/register units are powered by wired power.

9. The automated damper/register unit of claim 1 wherein said damper/register units are powered by energy harvesting.

10. The automated damper/register units of claim 1 wherein said damper/register units communication network capabilities consists of power line communication network capabilities.

* * * * *